US012718107B2

(12) United States Patent
Vasyltsov et al.

(10) Patent No.: US 12,718,107 B2
(45) Date of Patent: Aug. 25, 2026

(54) METHOD AND APPARATUS WITH NEURAL NETWORK PROCESSING

(71) Applicant: Samsung Electronics Co., Ltd., Suwon-si (KR)

(72) Inventors: Ihor Vasyltsov, Suwon-si (KR); Wooseok Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1041 days.

(21) Appl. No.: 17/546,547

(22) Filed: Dec. 9, 2021

(65) Prior Publication Data

US 2022/0222538 A1 Jul. 14, 2022

(30) Foreign Application Priority Data

Jan. 12, 2021 (KR) ........................ 10-2021-0004075

(51) Int. Cl.
*G06N 3/086* (2023.01)
*G06N 3/047* (2023.01)

(52) U.S. Cl.
CPC ............. *G06N 3/086* (2013.01); *G06N 3/047* (2023.01)

(58) Field of Classification Search
None
See application file for complete search history.

(56) References Cited

U.S. PATENT DOCUMENTS 7,363,280 B2 4/2008 Jin et al.
8,458,104 B2 6/2013 Truemper
12,450,476 B2 * 10/2025 Liu ......................... H03M 7/70
12,475,388 B2 * 11/2025 Yu ........................... G06N 3/09
2002/0013664 A1 1/2002 Strackeljan et al.
2007/0005313 A1 1/2007 Sevastyanov et al.
2014/0074758 A1 3/2014 Amid et al.
2016/0140434 A1 5/2016 Yilmaz et al.
2017/0032278 A1 2/2017 Gupta et al.
2018/0285736 A1 10/2018 Baum et al.
2019/0133480 A1 5/2019 Rahman et al.
2019/0369619 A1 12/2019 Carioni et al.
(Continued)

FOREIGN PATENT DOCUMENTS

CN 110533221 A 12/2019
CN 110689127 A 1/2020
(Continued)

OTHER PUBLICATIONS

Jin et al., "Neural Network Quantization with Scale-Adjusted Training", downloaded from <https://www.bmvc2020-conference.com/conference/papers/paper_0634.html> (Sep. 7, 2020), 14 pp. (Year: 2020).*

(Continued)

*Primary Examiner* — Ryan Barrett
(74) *Attorney, Agent, or Firm* — NSIP Law

(57) ABSTRACT

A processor-implemented method with neural network processing includes: determining whether a portion of a population comprising a plurality of instances to which different mixed-precision quantizations are applied for a neural network satisfies convergence criteria; generating, in response to the determination that the portion satisfies the convergence criteria, a new instance using the portion; and updating the population by adding the new instance to the population.

20 Claims, 10 Drawing Sheets

(56) References Cited

U.S. PATENT DOCUMENTS

| | | | | |
|---|---|---|---|---|
| 2020/0104715 | A1* | 4/2020 | Denolf | G06N 3/063 |
| 2020/0160169 | A1* | 5/2020 | Sura | G06N 3/088 |
| 2020/0218962 | A1 | 7/2020 | Lee et al. | |
| 2020/0285983 | A1 | 9/2020 | Bhattacharyya | |
| 2020/0302288 | A1 | 9/2020 | Ren et al. | |
| 2022/0092391 | A1* | 3/2022 | Miret | G06N 3/0495 |
| 2022/0164666 | A1* | 5/2022 | Liu | G06N 3/09 |
| 2022/0237513 | A1 | 7/2022 | He et al. | |

FOREIGN PATENT DOCUMENTS

| | | | |
|---|---|---|---|
| CN | 111310896 | A | 6/2020 |
| CN | 111402282 | A | 7/2020 |
| WO | WO 2020/102887 | A1 | 5/2020 |
| WO | WO 2020/102888 | A1 | 5/2020 |
| WO | WO 2020/160787 | A1 | 8/2020 |
| WO | WO 2021/260349 | A1 | 12/2021 |

OTHER PUBLICATIONS

Bazargani et al., "Planar Surfaces Recognition in 3D Point Cloud Using a Real-Coded Multistage Genetic Algorithm", downloaded from <https://www.researchgate.net/publication/301973926_Planar_Surfaces_Recognition_in_3D_Point_Cloud_Using_a_Real-Coded_Multistage_Genetic_Algorithm>, (Apr. 2015), 12 pp. (Year: 2015).*

Chen et al., "Joint Neural Architecture Search and Quantization", downloaded from <https://arxiv.org/abs/1811.09426>, (Nov. 23, 2018) 10 pp. (Year: 2018).*

Loni et al., "DeepMaker: A multi-objective optimization framework for deep neural networks in embedded systems", downloaded from <https://www.sciencedirect.com/science/article/pii/S0141933119301176>, Mar. 2020, 11 pp. (Year: 2020).*

Lin et al., "Neural-Hardware Architecture Search", downloaded from <https://mlforsystems.org/assets/papers/neurips2019/neural_hardware_lin_2019.pdf>, (2019) 5pp. (Year: 2019).*

Parsa et al., "Bayesian Multi-objective Hyperparameter Optimization for Accurate, Fast, and Efficient Neural Network Accelerator Design", downloaded from <https://www.frontiersin.org/journals/neuroscience/articles/10.3389/fnins.2020.00667/full>, (Jul. 20, 2020), 16 pp. (Year: 2020).*

Zhang et al., "Precision Gating: Improving Neural Network Efficiency with Dynamic Dual-Precision Activations", downloaded from <https://arxiv.org/abs/2002.07136>, (May 29, 2020), 14 pp. (Year: 2020).*

Dai, Cai, et al. "A new orthogonal evolutionary algorithm based on decomposition for multi-objective optimization" *Journal of the Operational Research Society* vol. 1, No. 13, School of Computer Science and Technology, Xidian University, Xian, P.R. China Jan. 28, 2015 (14 pages in English).

Wang, Kuan, et al. "Hardware-Centric AutoML for Mixed-Precision Quantization" *International Journal of Computer Vision Massachusetts Institute of Technology*, Cambridge, USA Jun. 11, 2020 (14 pages in English).

El-Ghazali Talbi "Optimization of deep neural networks: a survey and unified taxonomy" *ACM Comput. Surv*. hal-02570804v2 vol. 00, No. 00, Article 00, 2020 (37 pages in English).

Parsa, Maryam, et al. "Bayesian Multi-objective Hyperparameter Optimization for Accurate, Fast, and Efficient Neural Network Accelerator Design." *Frontiers in neuroscience* vol. 14, Article 667 Jul. 21, 2020 (16 pages in English).

Chen, Yukang, et al. "Joint Neural Architecture Search and Quantization." arXiv:1811.09426v1 [cs.CV] Nov. 23, 2018, p. 4321-4330.

Lin, Yujun, et al. "Neural-Hardware Architecture Search." NeurIPS WS, 2019, (5 pages in English).

Loni, Mohammad, et al. "DeepMaker: A Multi-objective Optimization Framework for Deep Neural Networks in Embedded Systems." Microprocessors and Microsystems 73 (2020): 102989, (11 pages in English).

Extended European search report issued on Jun. 20, 2022, in counterpart European Patent Application No. 21217974.1 (12 pages in English).

Wang, Tianzhe, et al., "APQ: Joint Search for Network Architecture, Pruning and Quantization Policy", Proceedings of the IEEE/CVF Conference on Computer Vision and Pattern Recognition, arXiv:2006.08509v1, Jun. 15, 2020, (10 Pages in English).

Chinese Office Action Issued on Apr. 21, 2026, in Counterpart Chinese Patent Application No. 202210030809.3 (8 Pages in English, 6 Pages in Chinese).

Korean Office Action Issued on Apr. 28, 2026, in Counterpart Korean Patent Application No. 10-2021-0004075 (4 Pages in English, 8 Pages in Korean).

* cited by examiner

METHOD AND APPARATUS WITH NEURAL NETWORK PROCESSING

CROSS-REFERENCE TO RELATED APPLICATIONS

This application claims the benefit under 35 USC § 119(a) of Korean Patent Application No. 10-2021-0004075, filed on Jan. 12, 2021, in the Korean Intellectual Property Office, the entire disclosure of which is incorporated herein by reference for all purposes.

BACKGROUND

1. Field

The following description relates to a method and apparatus with neural network processing.

2. Description of Related Art

Multi-objective optimization (MOO) may be an important and actual task in hardware (and/or hardware implementing software) design, as it may enable the generation of models, architectures, and devices that may simultaneously satisfy multiple objectives. An attempt has been made to apply the MOO approach for deep neural network (DNN) model optimization in terms of contradictory objectives (e.g., accuracy, size, latency, power consumption, etc.).

Further, state-of-the-art DNN models may be too huge and may not be efficient enough to be executed in limited usage environments such as mobile devices. Quantization of DNN models may optimize a predetermined model to be executed on predetermined hardware, and particularly, mixed-precision quantization may be an approach of DNN optimization.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with neural network processing includes: determining whether a portion of a population comprising a plurality of instances to which different mixed-precision quantizations are applied for a neural network satisfies convergence criteria; generating, in response to the determination that the portion satisfies the convergence criteria, a new instance using the portion; and updating the population by adding the new instance to the population.

The portion may include one or more instances selected from the plurality of instances determined as most appropriate for one or more of a plurality of objectives for the neural network.

The convergence criteria may be determined by comparing a dispersion for the portion to a predetermined first threshold.

The dispersion may include either one of an averaged standard deviation and a median absolute deviation (MAD) for the portion.

The generating may include determining a precision of a corresponding layer included in the new instance based on a representative value for precisions of the corresponding layer included in each instance of the portion.

The generating may include determining the precision of the corresponding layer included in the new instance based on a comparison between the representative value and one or more predetermined second thresholds.

The method may include selecting an instance to which an optimized mixed-precision quantization of the neural network is applied, from the updated population.

The method may include: determining whether an update termination condition set for the population is satisfied; determining, in response to the update termination condition not being satisfied, whether a second portion of the population satisfies the convergence criteria; and generating, in response to the determination that the second portion satisfies the convergence criteria, a second new instance using the second portion and updating the population by adding the second new instance to the population.

The update termination condition may be determined based on any one or any combination of any two or more of whether the plurality of instances included in the population converge, the number of times the population is updated, and a time used for updating the population.

A plurality of initial instances included in the population may be generated based on any one or any combination of any two or more of random, genetic algorithm (GA), Bayesian optimization (BO), reinforcement learning (RL), and evolutionary optimization (EO).

The method may include determining whether to additionally generate the plurality of initial instances, based on any one or any combination of any two or more of generation times of the plurality of initial instances, a size of the population, whether convergence occurs between the plurality of initial instances, and whether the plurality of initial instances include an initial instance corresponding to local optimization.

The method may include performing a data inference using the neural network to which mixed-precision quantizations of the updated population are applied.

In another general aspect, one or more embodiments include a non-transitory computer-readable storage medium storing instructions that, when executed by a processor, configure the processor to perform any one, any combination, or all operations and methods described herein.

In another general aspect, an apparatus with neural network processing includes: one or more processors configured to: determine whether a portion of a population comprising a plurality of instances to which different mixed-precision quantizations are applied for a neural network satisfies convergence criteria, generate, in response to the determination that the portion satisfies the convergence criteria, a new instance by using the portion, and update the population by adding the new instance to the population.

The portion may include one or more instances selected from the plurality of instances determined as most appropriate for one or more of a plurality of objectives for the neural network.

The convergence criteria may be determined by comparing a dispersion for the portion to a predetermined first threshold.

For the generating, the one or more processors may be configured to determine a precision of a corresponding layer included in the new instance based on a representative value for precisions of a corresponding layer included in each instance of the portion.

For the generating, the one or more processors may be configured to select an instance to which an optimized mixed-precision quantization of the neural network is applied, from the updated population.

The one or more processors may be configured to: determine whether an update termination condition set for the population is satisfied, determine, in response to the update termination condition not being satisfied, whether a second portion of the population satisfies the convergence criteria, and generate, in response to the determination that the second portion satisfies the convergence criteria, a second new instance using the second portion and update the population by adding the second new instance to the population.

In another general aspect, a processor-implemented method with neural network processing includes: determining instances having converging features among a population comprising instances to which different mixed-precision quantizations are applied for a neural network; generating a new instance based on a representative value determined based on precisions of the determined instances corresponding to a same layer of the neural network; and updating the population by adding the new instance to the population.

The representative value may be determined based on an average of the precisions of the determined instances corresponding to the same layer.

The generating may include determining a precision of the new instance corresponding to the same layer to be one of a plurality of predetermined precisions, by comparing the representative value to one or more predetermined thresholds.

For another layer the neural network, the determined instances may have a same precision.

The generating may include determining a precision of the new instance corresponding to other layer to be the same precision.

Other features and aspects will be apparent from the following detailed description, the drawings, and the claims.

Figure 1:
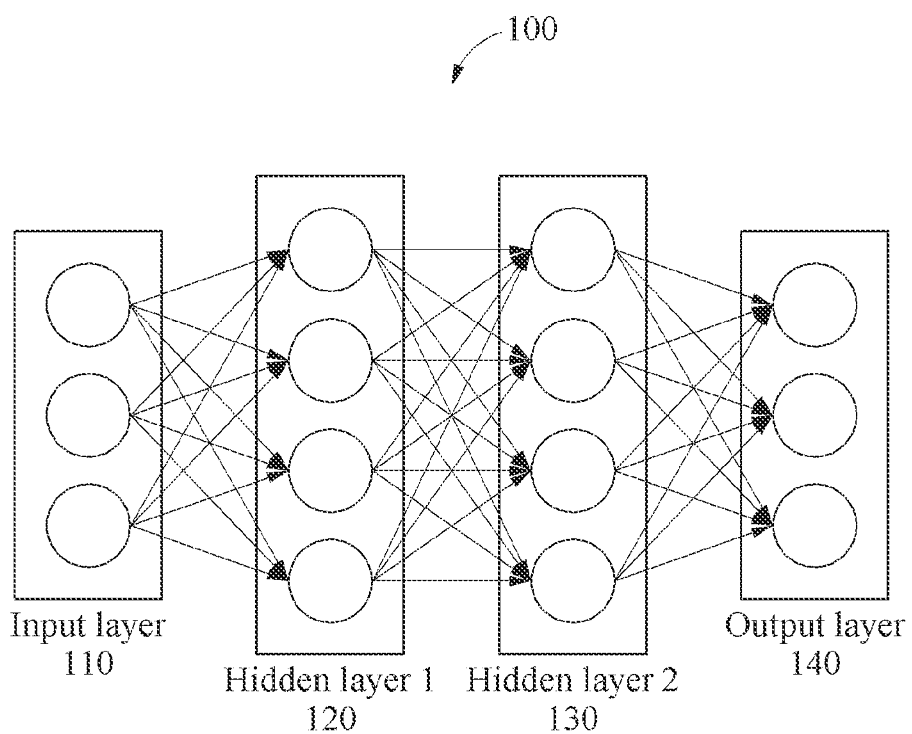
FIG. 1 illustrates an example of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the present disclosure, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, integers, steps, operations, elements, components and/or populations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of a neural network.

Referring to FIG. 1, a neural network 100 includes a plurality of layers. The neural network 100 may include an input layer 110, a plurality of hidden layers 120 and 130 (e.g., two or more hidden layers), and an output layer 140. The neural network 100 may be used to perform a data inference. The data inference may include, for example, pattern recognition (e.g., object recognition, face identification, etc.), sequence recognition (e.g., speech, gesture, and handwritten texture recognition, machine translation, machine interpretation, etc.), control (e.g., vehicle control, processor control, etc.), recommendation services, decision making, medical examination or diagnosis, financial applications, data mining, and/or the like. However, the examples of data inference are not limited thereto. Herein, the neural network 100 may also be referred to as a model for the convenience of description.

Each of the layers may include a plurality of nodes. Each node may perform a calculation and have one or more inputs and an output, and the nodes may be connected to each other.

The input layer 110 may include one or more nodes to which data is directly input without being input through a connection to another node (e.g., a node of a previous layer). The output layer 140 may include one or more nodes not having a connection to another node (e.g., a node of a subsequent layer). The hidden layers 120 and 130 may be the remaining layers of the neural network 100 from which the input layer 110 and the output layer 140 are excluded, and include nodes corresponding to an input node or output node in a relationship with another node. The neural network 100 is illustrated merely as an example in FIG. 1 for the convenience of description, and thus the scope of examples is not limited to the illustrated structure of the neural network 100. The neural network 100 used in the example may be provided in various structures. The number of hidden layers included in the neural network 100, the number of nodes included in each layer, and/or the connection between nodes may vary depending on an example. A neural network including a plurality of hidden layers, such as, for example, the neural network 100, may also be referred to as a deep neural network (DNN).

A weight may be set for a connection between nodes. For example, a weight may be set for a connection between a node included in the input layer 110 and another node included in the hidden layer 120. The weight may be adjusted or changed. The weight amplifies, reduces, or maintains a relevant data value, thereby determining a degree of influence of the data value on a final result. The weight may correspond to a parameter of the neural network 100.

To each node included in one layer, weighted values of nodes included in a previous layer may be input. A weighted value may refer to a value obtained as a value (e.g., activation) of a node included in the previous layer is multiplied by a weight. A process of inputting weighted data from a predetermined layer to the next layer may be referred to as propagation.

A weight and activation may be represented with 32-bit flowing point (FP32) precision that represents data by 32 bits, or in 16-bit brain floating point (BFLOAT16) precision that represents data by 16 bits. While the accuracy of inference may improve through such precisions, it may take a lot of time and resources (e.g., power consumption, memory, etc.) to perform inference using the neural network 100 or to train the neural network 100 having such precisions, and it may be difficult to operate the neural network 100 having such precisions in a usage environment with limited resources (e.g., a mobile device, computer, etc.).

When the weight and activation are represented with relatively few bits through model quantization, the inference by the neural network 100 may be compressed and accelerated. When the neural network 100 is executed using a low-precision accelerator (e.g., an accelerator with INT2, INT4, or INT8 precision), latency and power consumption may be effectively reduced during inference. However, when the same precision (for example, the number of bits) is applied to all layers included in the neural network 100, the accuracy of inference may decrease due to quantization.

In mixed-precision quantization, the plurality of layers included in the neural network 100 may have different precisions. Applying a high precision to a sensitive layer of the plurality of layers and applying a low precision to a robust layer through mixed-precision quantization may minimize the performance degradation caused by quantization, but may increase the complexity for searching for an optimal mixed-precision quantization. For example, when the neural network 100 includes fifty layers, and the neural network 100 is configured to use three precisions (e.g., INT4, INT8, and INT16), a total search space may have a considerable size corresponding to $3^{50}$. In addition, when a multi-objective optimization (MOO) is to simultaneously satisfy several contradictory objectives (e.g., model accuracy and size), a quantization parameter search of the neural network 100 may be more complex.

A neural network processing method and apparatus of one or more embodiments described herein may perform a process of generating a new instance using a converging portion of a plurality of instances included in a MOO population and including the generated instance to the MOO population. The plurality of instances may be those obtained by applying different mixed-precision quantizations to a predetermined neural network 100. By generating a best instance by reusing an existing instance close to a convergence front, the neural network processing method and apparatus of one or more embodiments may generate the MOO population more efficiently in terms of computational complexity. Hereinafter, examples will be described in more detail.

Figure 2:
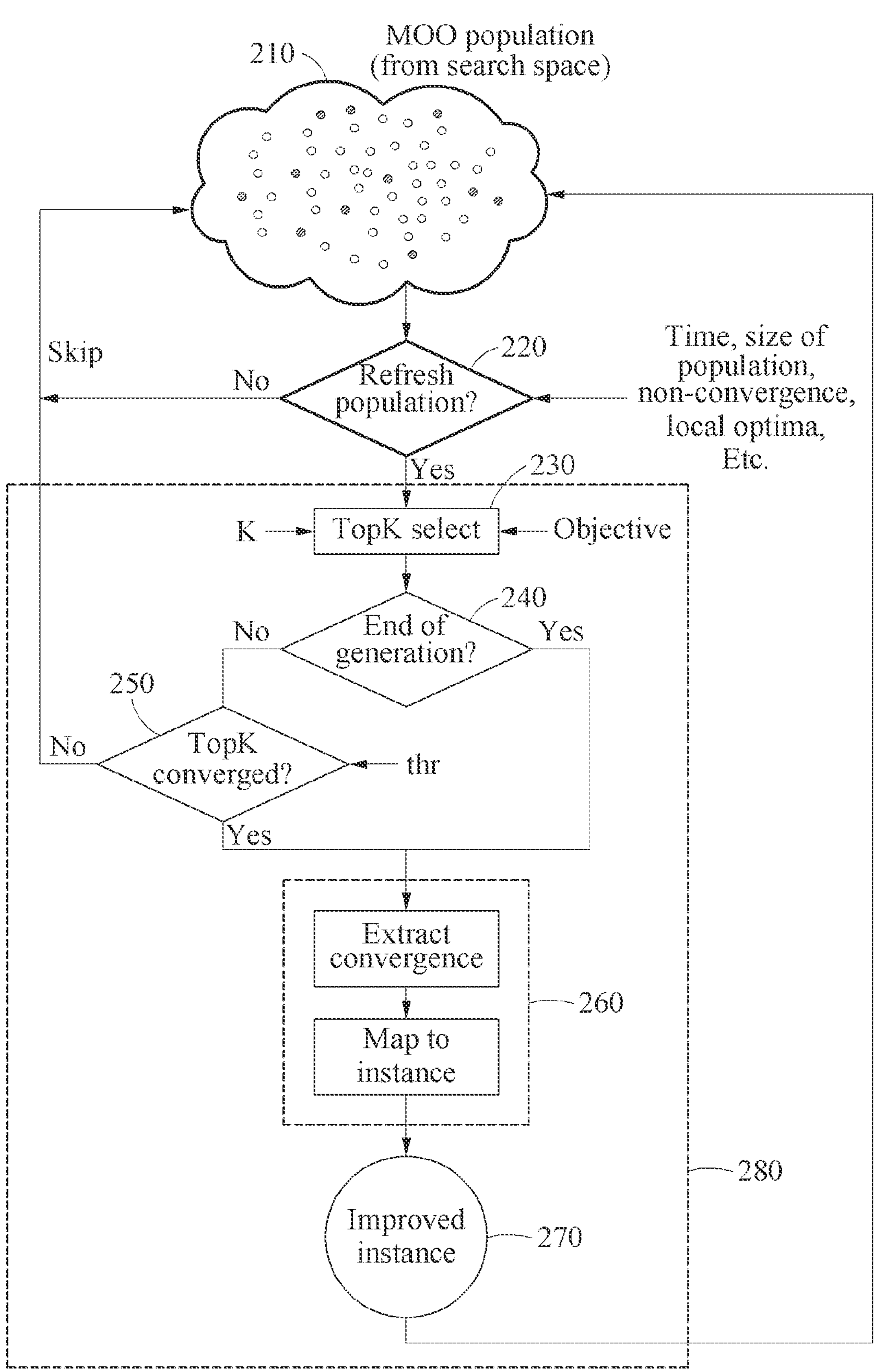
FIG. 2 illustrates an example of generating a multi-objective optimization (MOO) population for a neural network to which a mixed-precision quantization is applied.

FIG. 2 illustrates an example of generating a multi-objective optimization (MOO) population for a neural network to which a mixed-precision quantization is applied.

A neural network processing method and apparatus of one or more embodiments may optimize a neural network by generating a multi-objective optimization (MOO) population and selecting an instance to which an optimal mixed-precision quantization is applied. A MOO population 210 may include a plurality of initial instances to which different mixed-precision quantizations are applied for a predetermined neural network. The plurality of initial instances may be generated based on any one or any combination of any two or more of random, genetic algorithm (GA), Bayesian optimization (BO), reinforcement learning (RL), and evolutionary optimization (EO). Random may be a method of determining a precision of each layer in random, and GA, BO, RL, and EO may each be a method of determining a precision of each layer through the corresponding scheme.

In the MOO population 210, the plurality of initial instances may be represented as white dots, and new instances, which will be described below, may be represented as black dots.

In operation 220, whether to refresh the MOO population 210 may be determined. Here, refreshing the MOO population 210 may be generating new instances using some converging instances, which will be described below, and updating the MOO population 210 by adding the generated instances to the MOO population 210. Whether to refresh the MOO population 210 may be determined based on any one or any combination of any two or more of a time, a size of the MOO population 210, a non-convergence, and a local optimization. For example, when a time of generation of the initial instances included in the MOO population 210 is less than a predetermined threshold (e.g., five minutes, etc.), it may be determined that the generated initial instances are not sufficient to generate a new instance using some converging instances, which will be described later. In such a case, refresh operation 280 may be skipped (e.g., "No" to "Refresh population?" in operation 220 of FIG. 2), and initial instances may be additionally generated. Further, when the size of the MOO population 210 including the initial instances is less than a predetermined threshold, convergence between the initial instances included in the MOO population 210 does not occur, and/or the initial instances included in the MOO population 210 do not include an initial instance corresponding to a local optimization, then it may be determined the generated initial instances are still not sufficient, and initial instances may be additionally generated.

When it is determined to refresh the MOO population 210 in operation 220, operation 230 may then be performed.

In operation 230, K instances most appropriate for (or most closely meeting) an objective may be selected from among the plurality of instances included in the MOO population 210. Here, K is a natural number, which may be predetermined, or set by a user, or dynamically determined based on a system condition (e.g., available resources of hardware generating the MOO population 210, a progress rate of the operation of generating the MOO population 210, etc.). In addition, the objective may be at least one of a plurality of objectives for the neural network, and may include, for example, an inference accuracy of the neural network, a size, an inference time, a power consumption, and the like. The inference accuracy may be determined based on a loss of the neural network. As a non-limiting example, in operation 230, the K instances among the plurality of instances determined to meet a threshold determined based on the objective may be selected.

In operation 240, whether to end the generation of a new instance to be added to the MOO population 210 may be determined. Whether to end the generation of a new instance may be determined based on any one or any combination of any two or more of whether all instances included in the MOO population 210 converge, the number of times the MOO population 210 is updated, and a time used for updating the MOO population 210. For example, in operation 240, when there is no convergence between the plurality of instances included in the MOO population 210, the number of times the MOO population 210 is updated is less than or equal to a predetermined threshold, and/or the time used for updating the MOO population 210 is less than or equal to a predetermined threshold, then it may be determined that the MOO population 210 is to be updated, and it may be determined not to end the generation of a new instance. When it is determined in operation 240 not to end the generation of a new instance, operation 250 may then be performed. When it is determined in operation 240 to end the generation of a new instance, operation 260 may be performed a predetermined number of times (e.g., one time, two times, etc.), and then the operation of generating the MOO population may be terminated.

In operation 250, whether the K instances satisfy convergence criteria may be determined. For example, whether the K instances converge may be determined based on a comparison between metric values of the K instances and a predetermined threshold. A non-limiting example of the operation of determining whether the K instances converge will be described further below with reference to FIG. 6.

When it is determined that the K instances do not satisfy the convergence criteria, initial instances may be additionally generated and added to the MOO population 210, as described above. Conversely, when it is determined that the K instances satisfy the convergence criteria, operation 260 may then be performed.

In operation 260, a new instance may be generated using the K instances. For example, converging features (e.g., converging layer precisions) may be extracted from the K instances, and a new instance may be generated based on the extracted converging features. In an example, instances having converging features may mean that, for a same layer of a model, the instances have a same or similar precision. The new instance generated based on the converging features of the K instances most appropriate for the objective may inherit best properties of the K instances and thus, may correspond to an improved instance 270. The generated new instance may be added to the MOO population 210, and may be represented as a black dot in the MOO population 210. A non-limiting example of the process of generating a new instance will be described further below with reference to FIG. 3.

Refresh operation 280 may be performed for each of the plurality of objectives for the neural network. By repeating the process of determining whether a portion, most appropriate for a predetermined objective, of a plurality of instances included in a current population satisfies convergence criteria and generating a new improved instance using the portion when the portion satisfies the convergence criteria, the neural network processing method and apparatus of one or more embodiments may effectively generate the MOO population 210 for the neural network. The generated new instance may improve the properties of the MOO population 210 and thus, further converge to a Pareto front. A non-limiting example of this will be described further below with reference to FIG. 8.

Figure 3:
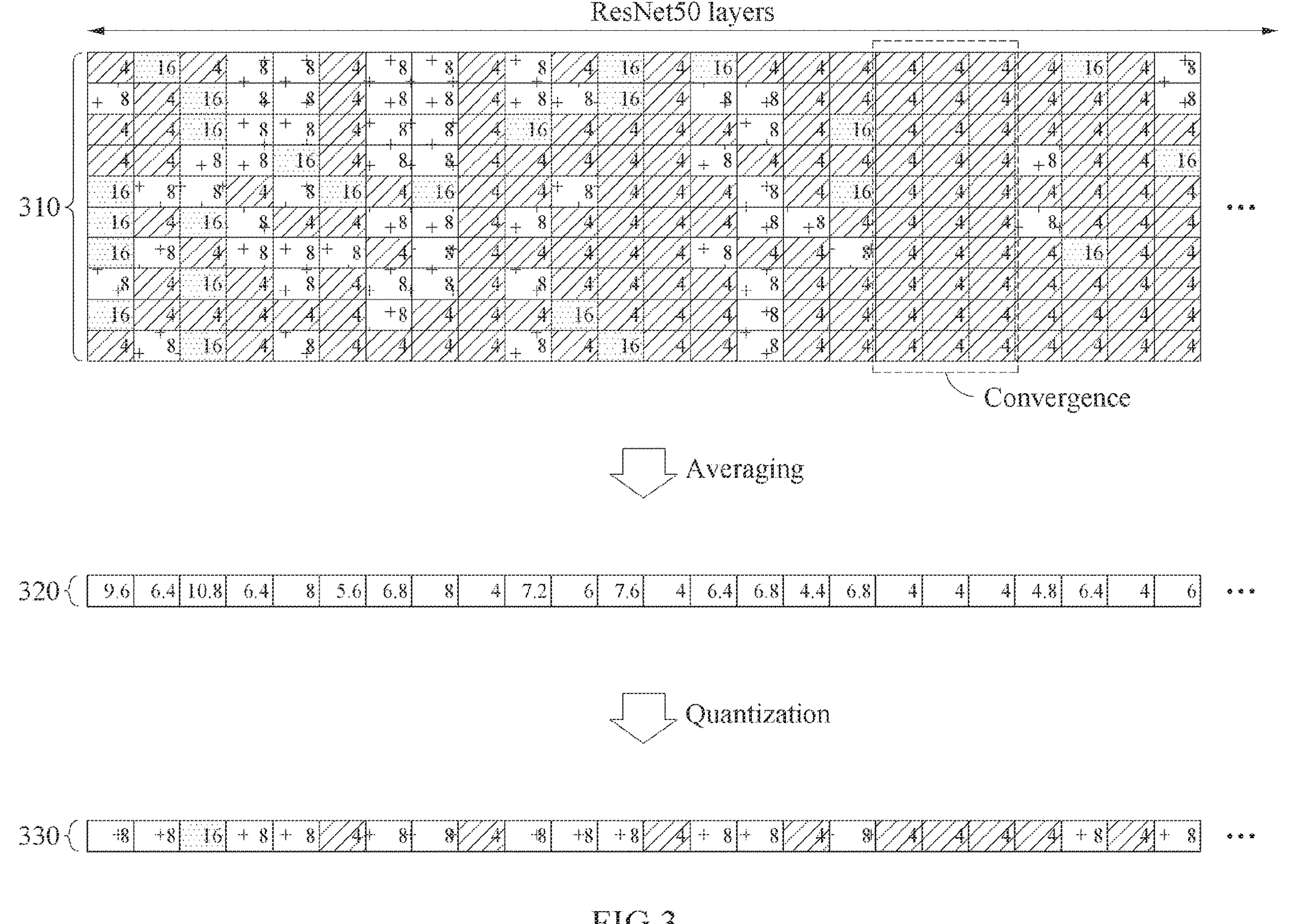
FIGS. 3 and 4 illustrate examples of generating one or more new instances.
Figure 4:
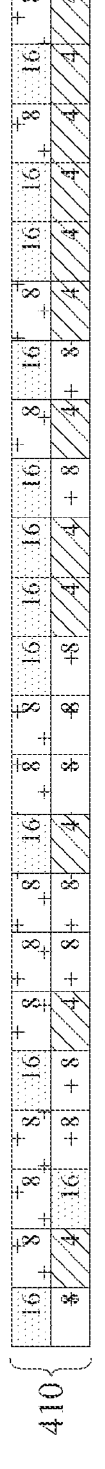

FIGS. 3 and 4 illustrate examples of generating one or more new instances.

Referring to FIG. 3, an example of generating a new instance 330 from ten instances 310 selected from among a plurality of instances as being most appropriate for at least one of a plurality of objectives is shown. For example, at least one of the plurality of objectives may be an accuracy, and ten instances 310 having a smallest loss value may be selected from among the plurality of instances.

The ten instances 310 may be instances to which different mixed-precision quantizations are applied for a neural network (e.g., ResNet50) and it may be assumed that the ten instances 310 satisfy convergence criteria for the convenience of description. In the instances 310 shown in FIG. 3, a vertical axis may indicate different instances, and a horizontal axis may indicate layers included in each instance. A number in a box indicating each layer may indicate a precision. For example, a number in a box may indicate a precision of a layer of the corresponding instance. For example, "4" may indicate a INT4 precision, "8" may indicate a INT8 precision, and "16" may indicate a INT16 precision. Some layers of the instances 310 shown in FIG. 3 may converge to a predetermined precision (e.g., INT4), and the ten instances 310 selected as being most appropriate for at least one of the plurality of objectives may have converging features (e.g., converging layer precisions). By generating the new instance 330 to have the converging features of the selected ten instances 310, the neural network processing method and apparatus of one or more embodiments may easily obtain an improved instance.

To generate the new instance 330, an average value of precisions of a corresponding layer included in each of the ten instances 310 may be calculated. For example, an average value 9.6 of precisions 4, 8, 4, 4, 16, 16, 16, 8, 16, and 4 of a first layer included in each of the ten instances 310 may be determined as a precision of a first layer of an averaged instance 320. In some examples, the layers may have predetermined precisions (e.g., 4, 8, and 16) only. Thus, a process of mapping an averaged precision to the predetermined precisions may be additionally performed.

By performing a quantization process to compare the precisions of the layers included in the averaged instance 320 to thresholds (e.g., 6 and 10) as shown below, the new instance 330 may be determined. However, the following thresholds are exemplary and not intended to limit examples.

$$w_i = \begin{cases} 4, & \text{if } \overline{w_i} < 6 \\ 8, & \text{if } 6 \leq \overline{w_i} < 10 \\ 16, & \text{if } 10 \leq \overline{w_i} \end{cases} \qquad \text{Equation 1}$$

In Equation 1, $\overline{w_i}$ is an average value of precisions of a corresponding layer included in each of the ten instances 310, and may be a precision of each layer included in the averaged instance 320. $w_i$ may be a precision, of each layer included in the new instance 330, determined based on a comparison of $\overline{w_i}$ and thresholds. For example, using Equation 1, when the precision of the first layer of the averaged instance 320 is 9.6, which falls between the thresholds 6 and 10, the precision of the first layer of the new instance 330 may be determined to be 8, that is, INT8.

As described above, by reusing some instances close to a convergence front among the plurality of instances included in the MOO population, the new instance 330 that has improved more efficiently in terms of computational complexity may be generated. The generated new instance 330 may be added to the MOO population, and the process described above may be repeatedly performed for the updated MOO population.

Referring to FIG. 4, new instances 410 generated by using five instances selected from among a plurality of instances in a MOO population as being most appropriate for a size-related objective of a plurality of objectives are shown. The generated new instances 410 may also be added to the MOO population.

Figure 5:
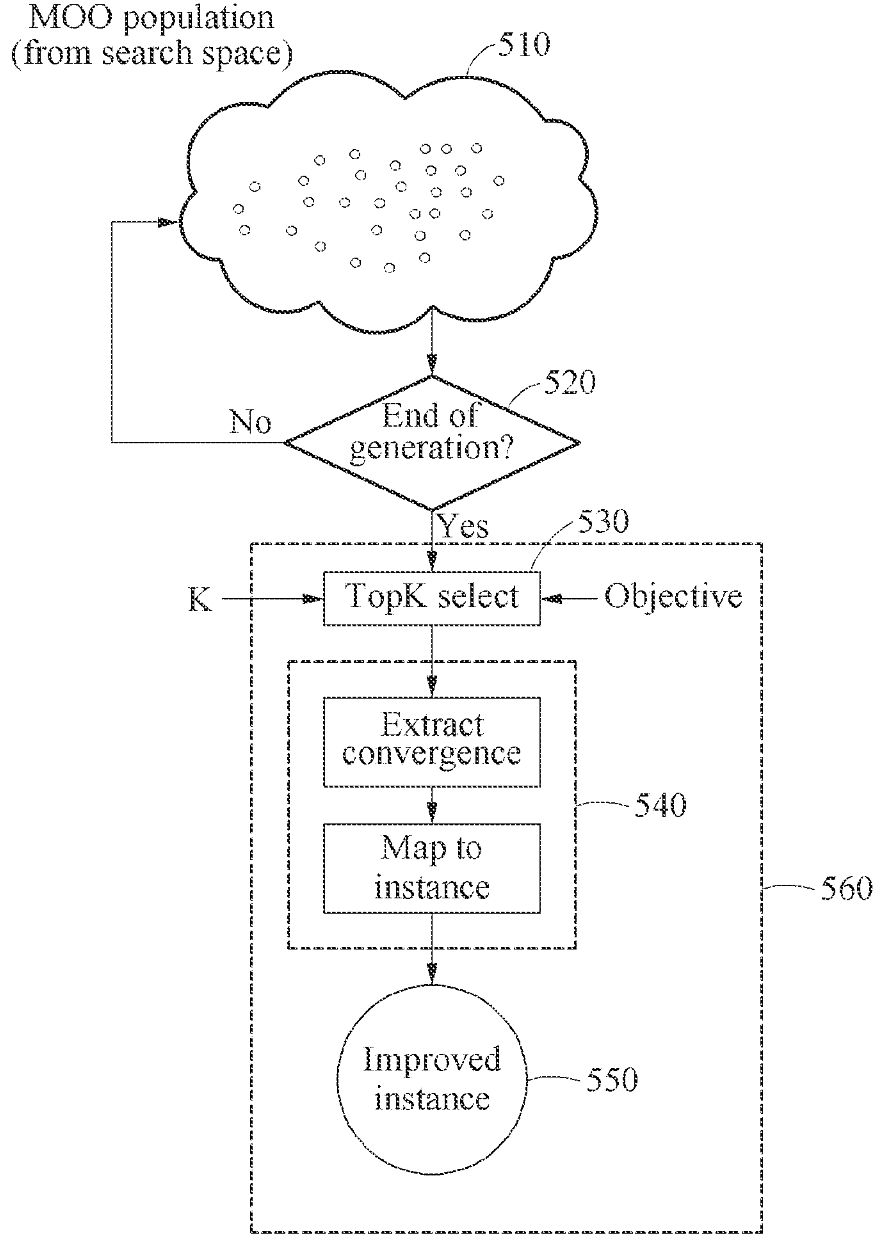
FIG. 5 illustrates an example of generating a MOO population.

FIG. 5 illustrates an example of generating a MOO population.

Referring to FIG. 5, an example of generating a MOO population 510 without determining whether a portion of a plurality of instances included in the MOO population 510 satisfies convergence criteria is shown. When an operation of generating the MOO population 510 is terminated (e.g., when an instance generation time elapses), simplified operations shown in FIG. 5 may be applied.

The MOO population 510 may include a plurality of initial instances to which different mixed-precision quantizations are applied for a predetermined neural network. The plurality of initial instances may be generated based on any one or any combination of any two or more of random, genetic algorithm (GA), Bayesian optimization (BO), reinforcement learning (RL), and evolutionary optimization (EO). When the MOO population 510 includes only the plurality of initial instances, unlike the MOO population 210 of FIG. 2, the MOO population 510 shown in FIG. 5 may include white dots indicating the plurality of initial instances.

In operation 520, it may be determined whether the plurality of initial instances generated in the MOO population 510 are sufficient. For example, when a time of generation of the initial instances included in the MOO population 510 is less than a predetermined threshold, it may be determined that the generated initial instances are not sufficient to generate a new instance using some instances (a non-limiting example of which will be further described later), instance generation operation 560 may be skipped, and initial instances may be additionally generated. Further, when the size of the MOO population 510 including the initial instances is less than a predetermined threshold, convergence between the initial instances included in the MOO population 510 does not occur, and/or the initial instances included in the MOO population 510 do not include an initial instance corresponding to a local optimization, then it may be determined the generated initial instances are likewise not sufficient, instance generation operation 560 may be skipped, and initial instances may be additionally generated.

In operation 520, when it is determined that the plurality of initial instances generated in the MOO population 510 are sufficient, operation 530 may then be performed.

In operation 530, K instances most appropriate for an objective may be selected from among the plurality of instances included in the MOO population 510. Here, K is a natural number, which may be predetermined, or set by a user, or dynamically determined based on a system condition (e.g., available resources of hardware generating the MOO population 510, a progress rate of the operation of generating the MOO population 510, etc.). In addition, the objective may be at least one of a plurality of objectives for the neural network, and may include, for example, an inference accuracy of the neural network, a size, an inference time, a power consumption, and the like. Here, the inference accuracy may be determined based on a loss of the neural network.

In operation 540, a new instance may be generated using the K instances. When a sufficient number of initial instances are generated in the MOO population 510 through operation 520, on the assumption that the generated initial instances already include an initial instance close to a convergence front, whether the K instances satisfy convergence criteria may not be determined separately. Since a new instance may be generated without checking convergence, the operation may be simplified.

For example, converging features may be extracted from the K instances, and a new instance may be generated based on the extracted converging features. For example, the new instance generated based on the converging features of the K instances most appropriate for the objective may inherit best properties of the K instances and thus, may correspond to an improved instance 550. The generated new instance may be added to the MOO population 510.

In some examples, instance generation operation 560 may be performed for each of the plurality of objectives for the neural network. By repeating the process of generating a new improved instance using a portion, most appropriate for a predetermined objective, of a plurality of instances included in a current population, the neural network processing method and apparatus of one or more embodiments may effectively generate the MOO population 510 for the neural network. The generated new instance may improve the properties of the MOO population 510 and thus, further converge to a Pareto front.

Figure 6:
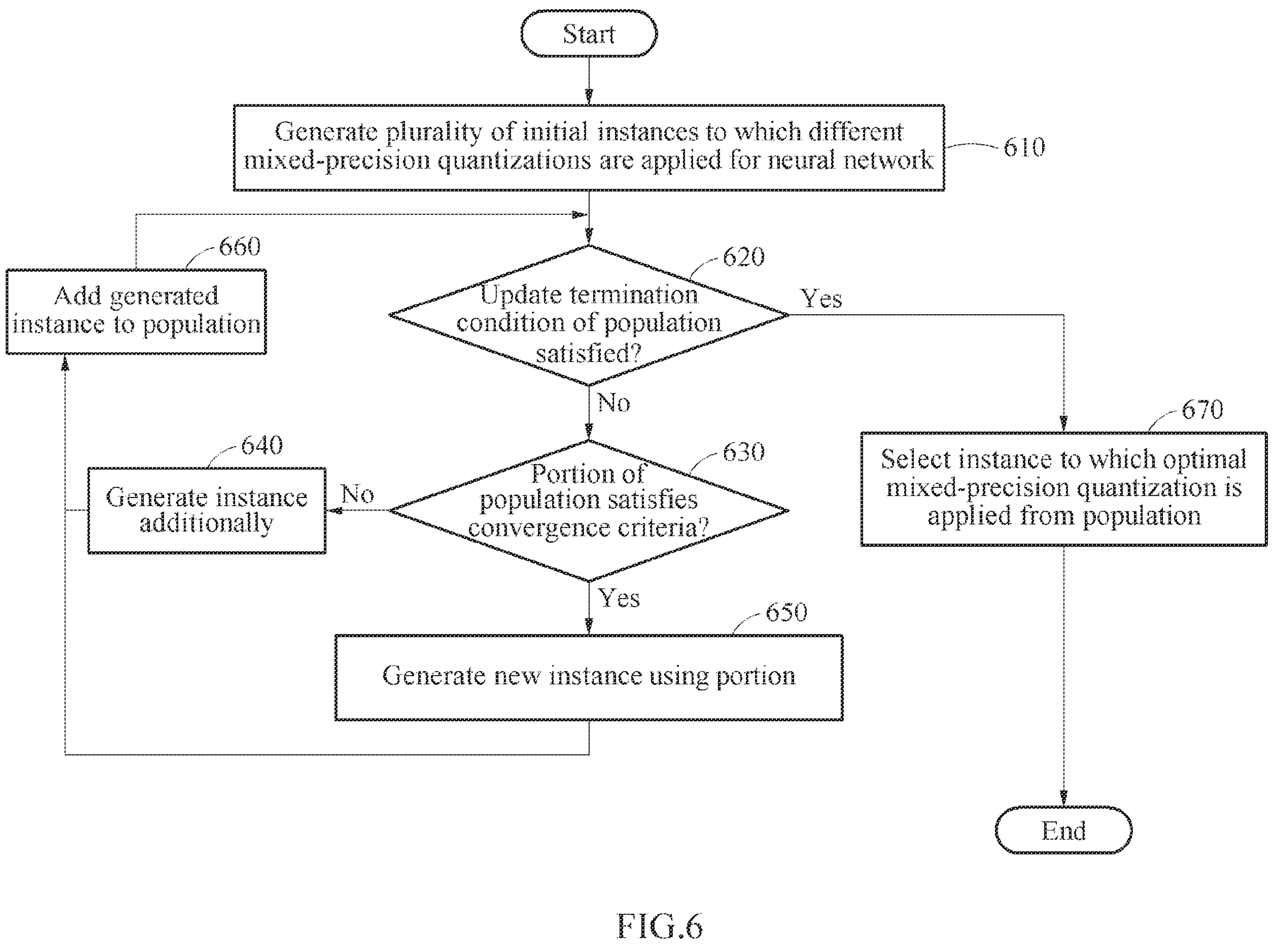
FIG. 6 illustrates an example of selecting an optimized neural network from a MOO population.

FIG. 6 illustrates an example of selecting an optimized neural network from a MOO population. Herein, a MOO population may also be referred to as a population for the convenience of description.

In operation 610, a plurality of initial instances to which different mixed-precision quantizations are applied may be generated for a neural network. The descriptions provided above may apply to the generation of the initial instances, and thus a detailed description will be omitted.

In operation 620, whether an update termination condition of the population is satisfied may be determined. For example, the update termination condition may be determined based on any one or any combination of any two or more of whether all instances included in the population converge, the number of times the population is updated, and a time used for updating the population. For example, when there is no convergence between the plurality of instances included in the population, the number of times the population is updated is less than or equal to a predetermined threshold, and/or the time used for updating the population is less than or equal to a predetermined threshold, then it may be determined that the population is to be updated, and it may be determined that the update termination condition of the population is not satisfied. When it is determined not to end the generation of a new instance, operation 630 may then be performed.

In operation 630, whether a portion of the population satisfies convergence criteria may be determined. Here, the portion may be K instances, most appropriate for a predetermined objective, of the plurality of instances included in the population. Whether the K instances converge may be determined based on a comparison between metric values of the K instances and a predetermined first threshold. The metric values may include a dispersion for the K instances. The dispersion may be a value indicating the level of dispersion of the K instances.

As an example, the dispersion may include an averaged standard deviation for the K instances. The averaged standard deviation may be expressed by Equation 2 below, for example.

$$\frac{1}{n}\sum_{i=1}^{n}\sigma(\{TopK\}) < thr \quad \text{Equation 2}$$

In Equation 2, i denotes a layer for which a standard deviation is to be obtained among the layers included in each of the K instances, n denotes the total number of layers included in the neural network, and $\sigma(\{TopK\})$ denotes a standard deviation of precisions of an i-th layer in each of the K instances. thr denotes the first threshold, and may be determined analytically, statistically, heuristically, or experimentally. A non-limiting example of the process of setting the first threshold will be described in further detail below with reference to FIG. 7.

The averaged standard deviation for the K instances may be determined by dividing the sum of standard deviations of the precisions of corresponding layers included in the K instances by n. When the averaged standard deviation is less than the first threshold, it may be determined that the K instances satisfy the convergence criteria. Conversely, when the averaged standard deviation is greater than the first threshold, it may be determined that the K instances do not satisfy the convergence criteria. When the averaged standard deviation is equal to the first threshold, it may be determined that the K instances satisfy or do not satisfy the convergence criteria according to an example.

As another example, the dispersion may include a median absolute deviation (MAD) for the K instances. The MAD may be expressed by Equation 3 below, for example.

$$MAD = \text{median}\left(\left|X_i - \tilde{X}\right|\right), \quad \text{Equation 3}$$

$$\text{where } \tilde{X} = \text{median}\ (X)$$

In Equation 3, $\tilde{X}$ denotes a median value of the precisions of the corresponding layer included in the K instances, $X_i$ denotes the precision of the corresponding layer included in the K instances, and $\text{median}(|X_i-\tilde{X}|)$ denotes a median value of absolute values obtained by subtracting the median value from the precisions of the corresponding layer included in the K instances.

When the determined MAD is less than the first threshold, it may be determined that the K instances satisfy the convergence criteria. Conversely, when the MAD is greater than the first threshold, it may be determined that the K instances do not satisfy the convergence criteria. When the MAD is equal to the first threshold, it may be determined that the K instances satisfy or do not satisfy the convergence criteria according to an example.

When it is determined that the portion of the population does not satisfy the convergence criteria, operation 640 may then be performed. In operation 640, initial instances may be additionally generated. Conversely, when it is determined that the portion of the population satisfies the convergence criteria, operation 650 may then be performed.

In operation 650, a new instance may be generated using the portion that satisfies the convergence criteria.

A precision of a corresponding layer included in the new instance may be determined based on a representative value for the precisions of a corresponding layer included in each of the K instances corresponding to the portion. The representative value is a value that representatively indicates the precisions of the corresponding layer included in each of the K instances, and may include, for example, either one or both of the average value described in FIG. 3 and a weighted average value $$\overline{w_i^*}$$

expressed by Equation 4 below, for example.

$$\overline{w_i^*} = \frac{\sum_{k=1}^{K}\alpha_k w_{i,k}}{\sum_{k=1}^{K}\alpha_k}, \quad \text{Equation 4}$$

$$\text{where } \alpha_k = \frac{1}{loss_k} \text{ or } \alpha_k = \frac{1}{\log\lceil loss_k\rceil}$$

In Equation 4, k denotes one of the K instances corresponding to the portion, i denotes a layer for which a weighted average value is to be obtained among the layers included in each of the K instances, and $w_{i,k}$ denotes a precision of an i-th layer included in the k-th instance in the portion. $\alpha_k$ denotes a weight applied to $w_{i,k}$, and may be determined to be, for example, a reciprocal of a loss $loss_k$ of the k-th instance, allowing a new instance to further converge to an instance with a low loss. When a deviation of loss values between the K instances is large, $\alpha_k$ may be determined to be a reciprocal of a log value of the loss $loss_k$ of the k-th instance.

By determining a contribution of the K instances through the weighted average value in a more appropriate manner, it is possible to more effectively generate an instance to which an optimal mixed-precision quantization and appropriate for a plurality of objectives for the neural network is applied.

In an example, a new instance may be generated by determining the precision of the corresponding layer included in the new instance based on a comparison between the representative value described above and one or more predetermined second thresholds. The description of FIG. 3 may apply to the threshold-based mapping scheme technique likewise, and thus a detailed description will be omitted.

In another example, the precision of the corresponding layer included in the new instance may be determined based on a value obtained by applying a predetermined function to the representative value described above. When hardware (e.g., an accelerator, a host processor, etc.) for executing the neural network supports an arbitrary precision bit-width, precisions of layers included in the new instance may be determined based on the predetermined function, even without an if operation performed in the threshold-based mapping scheme.

As an example, the predetermined function may include a log-based function, and the precisions of the layers included in the new instance may be determined by Equation 5 below, for example.

$$w_i = 2^{\lceil log_2(\overline{w_i}) \rceil} \quad \text{Equation 5}$$

In Equation 5, $\overline{w_i}$ denotes a representative value (e.g., an average value or a weighted average value) of precisions of an i-th layer included in each of the K instances, and $w_i$ denotes a precision of an i-th layer included in the new instance.

As another example, the predetermined function may include a round-off function, and the precisions of the layers included in the new instance may be determined by Equation 6 below, for example.

$$w_i = \lceil \overline{w_i} \rfloor \quad \text{Equation 6}$$

As the precision of each layer included in the new instance is determined to be a value obtained by applying a predetermined function to the representative value, hardware supporting an arbitrary precision bit-width may be utilized.

In operation 660, the generated instance may be added to the population. The instance generated in operation 640 or 650 may be added to the population, and operation 620 may then be performed.

When the update termination condition of the population is satisfied in operation 620, operation 670 may then be performed.

In operation 670, an instance to which an optimized mixed-precision quantization of the neural network is applied may be selected from the population. Through operations 610 to 660, the population may include improved instances close to the convergence front, and an instance to which a mixed-precision quantization optimized for a usage environment or objective of the neural network is applied may be selected from among the plurality of instances included in the population. A non-limiting example of this will be described further below with reference to FIG. 8.

Figure 7:
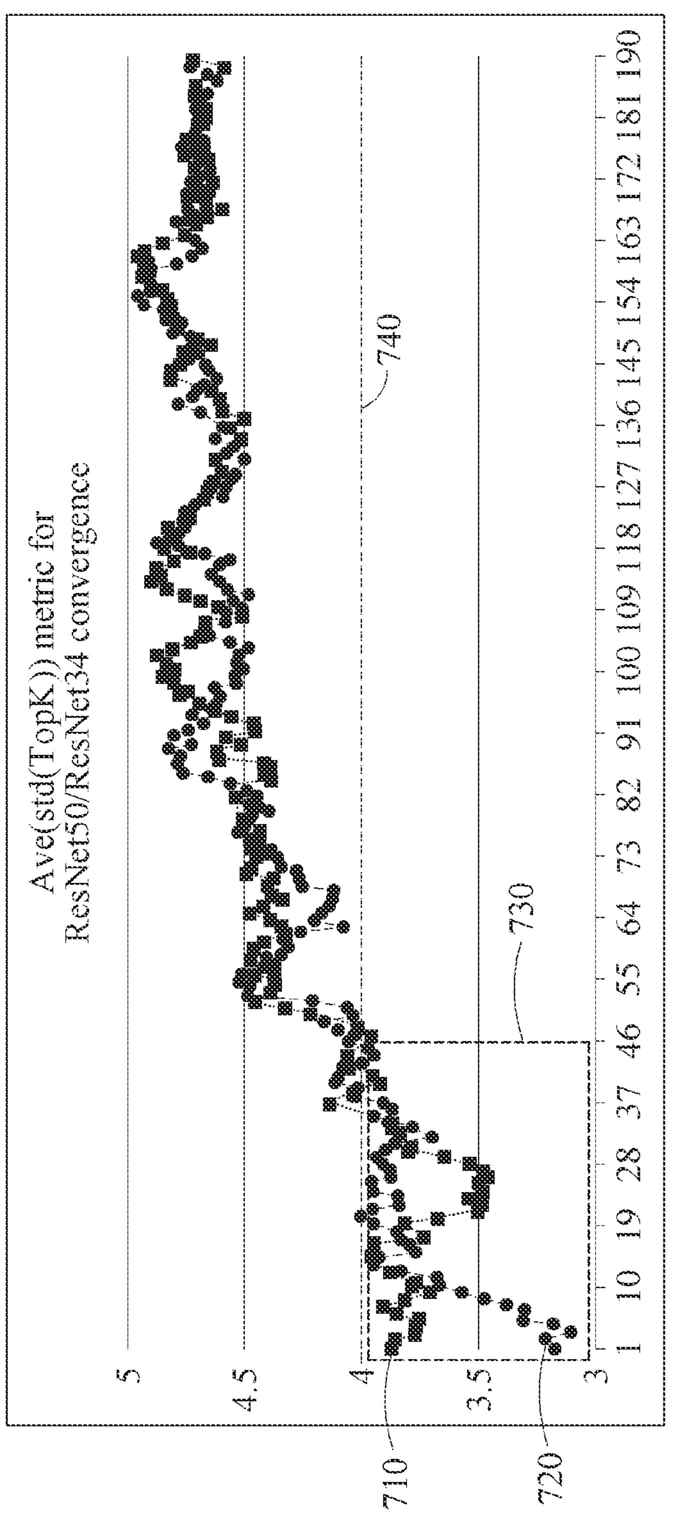
FIG. 7 illustrates an example of convergence criteria.

FIG. 7 illustrates an example of convergence criteria.

Referring to FIG. 7, examples of a metric value 710 of ResNet34 and a metric value 720 of ResNet50 for convergence analysis are shown. In the graph shown in FIG. 7, a horizontal axis may indicate instances included in a MOO population for each of ResNet50 and ResNet34, where the instances are represented in ascending order of loss value, and a vertical axis may indicate a metric value (e.g., an averaged standard deviation) of each of the instances. In the example shown in FIG. 7, the metric values 710 and 720 converge at a portion lower than a predetermined value 740 (e.g., 4) in a region 730. Through this, a threshold to be compared to the averaged standard deviation may be determined to be 4.

Figure 8:
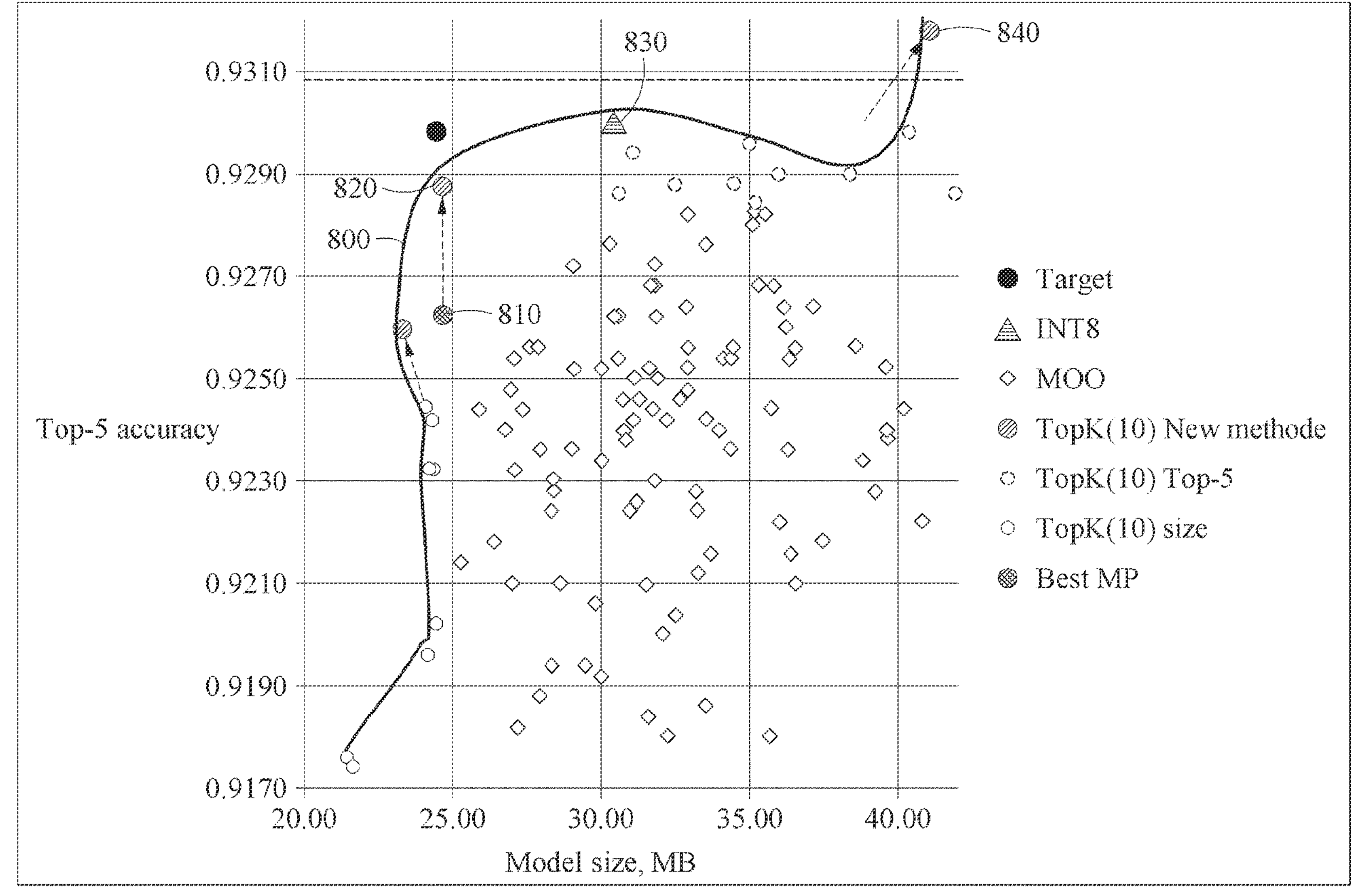
FIG. 8 illustrates an example of a plurality of instances represented based on a plurality of objectives.

FIG. 8 illustrates an example of a plurality of instances represented based on a plurality of objectives.

Referring to FIG. 8, an example of a plurality of instances of a population represented according to an accuracy and a model size is shown. A Pareto front 800 may be a virtual line connecting instances that are located at the front and with a best performance in various cases among a plurality of instances. An instance closer to the Pareto front 800 may have a higher performance. As an example, a new instance 820 may be generated using an instance 810 through the MOO population generation method described above, and the instance 820 may be an improved instance closer to a target instance than the instance 810 is.

An instance to which a mixed-precision quantization optimized for a usage environment or objective of a neural network is applied may be selected from among the plurality of instances included in the population. For example, to perform neural network-based inference on low-performance portable hardware such as a mid-range smart phone or an order smart phone released several years ago, the instance 820 with a small model size and little performance degradation may be selected as the instance to which the optimized mixed-precision quantization is applied. In addition, in a high-performance portable device such as a premium smart phone or a latest smart phone, data inference may be performed using a model with a medium size and better performance. Thus, the instance 830 may be selected as the instance to which the optimized mixed-precision quantization is applied. Further, in a high-performance computing device such as a personal computer or a server, data inference may be performed using a model with full performance even having a large model size. Thus, the instance 840 may be selected as the instance to which the optimized mixed-precision quantization is applied.

Figure 9:
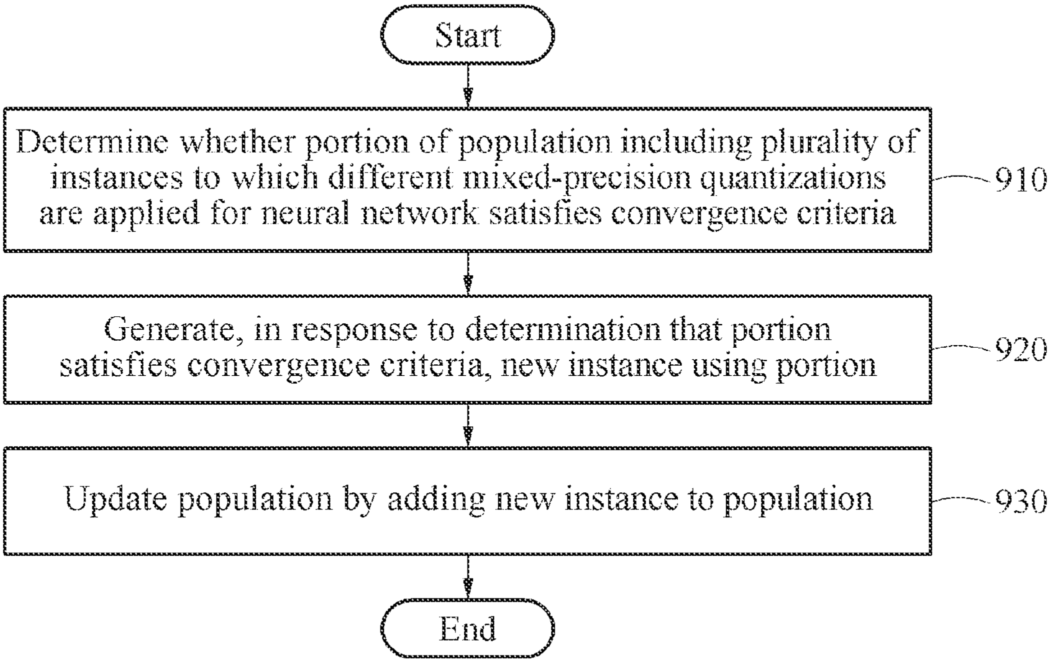
FIG. 9 illustrates an example of a neural network processing method.

FIG. 9 illustrates an example of a neural network processing method.

Referring to FIG. 9, a neural network processing method performed by a processor included in a neural network processing apparatus is shown.

In operation 910, the neural network processing apparatus may determine whether a portion of a population including a plurality of instances to which different mixed-precision quantizations are applied for a neural network satisfies convergence criteria. The portion may be one or more instances selected from the plurality of instances as being most appropriate for at least one of a plurality of objectives for the neural network.

The convergence criteria may be determined by a comparison of a dispersion for the portion and a predetermined first threshold. The dispersion may include an averaged standard deviation or MAD for the portion.

A plurality of initial instances included in the population may be generated based on any one or any combination of any two or more of random, GA, BO, RL, and EO.

In operation 920, the neural network processing apparatus may generate, in response to the determination that the portion satisfies the convergence criteria, a new instance by using the portion. The neural network processing apparatus may determine a precision of a corresponding layer included in a new instance based on a representative value for precisions of a corresponding layer included in each instance of the portion. The neural network processing apparatus may determine the precision of the corresponding layer included in the new instance based on an average value or weighted average value for the precisions of the corresponding layer included in each instance of the portion. The weighted average value may be determined by applying a weight determined based on a loss of each instance of the portion to the precision of the corresponding layer.

As an example, the neural network processing apparatus may determine the precision of the corresponding layer included in the new instance based on a comparison between the representative value and one or more predetermined second thresholds. As another example, the neural network processing apparatus may determine the precision of the corresponding layer included in the new instance based on a value obtained by applying a predetermined function to the representative value. The predetermined function may include a log-based function and a round-off function.

In operation 930, the neural network processing apparatus may update the population by adding the new instance to the population.

The neural network processing apparatus may select an instance to which an optimized mixed-precision quantization of the neural network is applied, from the updated population.

The neural network processing apparatus may determine whether an update termination condition set for the population is satisfied. The neural network processing apparatus may determine, in response to the update termination condition not being satisfied, whether a second portion of the population satisfies the convergence criteria, and generate, in response to the determination that the second portion satisfies the convergence criteria, a second new instance using the second portion and update the population by adding the second new instance to the population. The second part may or may not overlap the previous portion according to an example. The update termination condition may be determined based on any one or any combination of any two or more of whether the plurality of instances included in the population converge, the number of times the population is updated, and a time used for updating the population.

The examples of the neural network processing method and apparatus of one or more embodiments may improve the speed and quality of generation of a MOO population for a DNN model through mixed-precision quantization for on-device inference. By generating a best instance by reusing an existing instance close to a convergence front, the implementation may be easy and even stand-alone without a complex computation.

The descriptions provided with reference to FIGS. 1 to 8 may apply to the operations shown in FIG. 9, and thus a further detailed description will be omitted.

Figure 10:
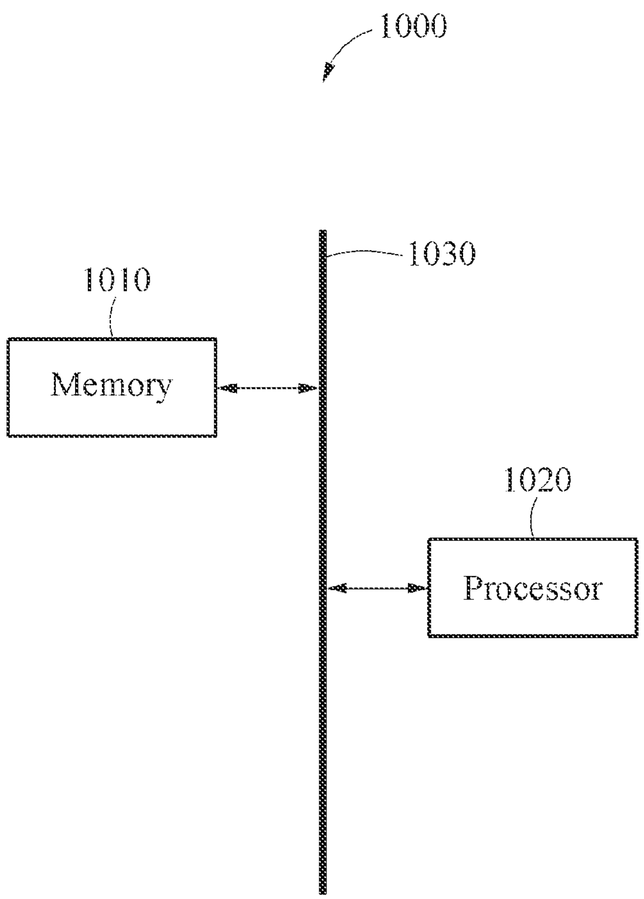
FIG. 10 illustrates an example of a neural network processing apparatus.

FIG. 10 illustrates an example of a neural network processing apparatus.

Referring to FIG. 10, a neural network processing apparatus 1000 may include a memory 1010 (e.g., one or more memories) and a processor 1020 (e.g., one or more processors). The memory 1010 and the processor 1020 may communicate with each other through a bus 1030, a peripheral component interconnect express (PCIe), a network on a chip (NoC), or the like.

The memory 1010 may include computer-readable instructions. The processor 1020 may perform the operations described above when the instructions stored in the memory 1010 are executed by the processor 1020. The memory 1010 may be a volatile memory or a non-volatile memory.

The processor 1020 may be a device that executes the instructions or programs or that controls the neural network processing apparatus 1000, and may include, for example, a host processor and/or an accelerator included in the neural network processing apparatus 1000. The host processor is a device that controls operations of components included in the neural network processing apparatus 1000, and may include, for example, a central processing unit (CPU). The accelerator may be an artificial intelligence (AI) accelerator configured to infer input data by executing a neural network in accordance with an instruction from the host processor, and may include, for example, a neural processing unit (NPU), a graphics processing unit (GPU), a tensor processing unit (TPU), a digital signal processor (DSP), and the like.

The processor 1020 may determine whether a portion of a population including a plurality of instances to which different mixed-precision quantizations are applied for the neural network satisfies convergence criteria, generates, in response to the determination that the portion satisfies the convergence criteria, a new instance using the portion, and updates the population by adding the new instance to the population. Further, the processor 1020 may perform, without limitation, the MOO population generation method described with reference to FIGS. 1-9 and the method of selecting an optimized neural network from the MOO population described with reference to FIGS. 1-9. That is, the processor 1020 may perform any combination or all of the operations described above with reference to FIGS. 1-9.

The neural network processing apparatus 1000 may be implemented by a server or a specially designed computing device. However, examples are non limited thereto. In addition, the neural network processing apparatus 1000 may be, without limitation, any of various computing devices such as a smart phone, a tablet, a laptop and a personal computer, various wearable devices such as a smart watch, smart glasses and smart clothes, various home appliances such as a smart speaker, a smart TV and a smart refrigerator, a smart car, a smart kiosk, an Internet of things (IoT) device, a walking assist device (WAD), a drone, and a robot.

In addition, the neural network processing apparatus 1000 may process the operations described above.

The neural network processing apparatuses, memories, processors, neural network processing apparatus 1000, memory 1010, processor 1020, and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD−Rs, CD+Rs, CD−RWs, CD+RWs, DVD-ROMs, DVD−Rs, DVD+Rs, DVD−RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with neural network processing, the method comprising:

determining whether to refresh a population based on at least two of a time, a size of the population, a non-convergence of the population, and a local optimization of the population;

determining, in response to the determination to refresh the population, whether a portion of the population satisfies convergence criteria, the population comprises comprising a plurality of instances each having a different mixed-precision quantization applied to layers of a neural network;

generating, in response to the determination that the portion satisfies the convergence criteria, a new instance by determining a precision for each corresponding layer of the new instance based on an average of precisions of the plurality of instances comprised in the portion;

updating the population by adding the new instance to the population, the updated population comprises instances that represent preferred trade-offs among a plurality of objectives for the neural network;

selecting from the updated population, based on at least one objective among the plurality of objectives, an optimized instance to which an optimized mixed-precision quantization of the neural network is applied for the neural network; and performing an inference based on the neural network using the optimized instance selected from the updated population, wherein the optimized mixed-precision quantization enables the at least one objective during the inference.

2. The method of claim 1, wherein the portion comprises one or more instances selected from the plurality of instances determined as most appropriate for one or more of the plurality of objectives for the neural network.

3. The method of claim 1, wherein the convergence criteria are determined by comparing a dispersion for the portion to a predetermined first threshold.

4. The method of claim 1, wherein the dispersion comprises either one of an averaged standard deviation and/or a median absolute deviation (MAD) for the portion.

5. The method of claim 1, wherein the generating of the new instance is based on a representative value for precisions of the corresponding layer included in each instance of the portion.

6. The method of claim 5, wherein the generating of the new instance comprises determining the precision of the corresponding layer included in the new instance based on a comparison between the representative value and one or more predetermined second thresholds.

7. The method of claim 1, further comprising:

selecting the instance from the updated population, wherein an optimized mixed-precision quantization of the neural network is applied to the instance.

8. The method of claim 1, further comprising:

determining whether an update termination condition set for the population is satisfied;

determining, in response to the update termination condition not being satisfied, whether a second portion of the population satisfies the convergence criteria; and generating, in response to the determination that the second portion satisfies the convergence criteria, a second new instance using the second portion and updating the population by adding the second new instance to the population.

9. The method of claim 8, wherein the update termination condition is determined based on any one or any combination of any two or more of whether the plurality of instances included in the population converge, the number of times the population is updated, and a time used for updating the population.

10. The method of claim 1, wherein a plurality of initial instances included in the population are generated based on any one or any combination of any two or more of random, genetic algorithm (GA), Bayesian optimization (BO), reinforcement learning (RL), and evolutionary optimization (EO).

11. The method of claim 10, further comprising:

determining whether to additionally generate the plurality of initial instances, based on any one or any combination of any two or more of generation times of the plurality of initial instances, a size of the population, whether convergence occurs between the plurality of initial instances, and whether the plurality of initial instances include an initial instance corresponding to local optimization.

12. The method of claim 1, further comprising performing a data inference using the neural network to which mixed-precision quantizations of the updated population are applied.

13. A non-transitory computer-readable storage medium storing instructions that, when executed by one or more processors, configure the one or more processors to perform the method of claim 1.

14. An apparatus with neural network processing, the apparatus comprising:

one or more processors configured to:

determine whether to refresh a population based on at least two of a time, a size of the population, a non-convergence of the population, and a local optimization of the population;

determine, in response to the determination to refresh the population, whether a portion of the population satisfies convergence criteria, the population comprising comprises a plurality of instances each having a different mixed-precision quantization applied to layers of a neural network;

generate, in response to the determination that the portion satisfies the convergence criteria, a new instance by determining a precision for each corresponding layer of the new instance based on an average of precisions of the plurality of instances comprised in the portion;

update the population by adding the new instance to the population where the updated population comprises instances that represent preferred trade-offs among a plurality of objectives for the neural network;

select from the updated population, based on at least one objective among the plurality of objectives, an optimized instance to which an optimized mixed-precision quantization of the neural network is applied for the neural network; and perform an inference based on the neural network using the optimized instance selected from the updated population, the optimized mixed-precision quantization enables the at least one objective during the inference.

15. The apparatus of claim 14, wherein the one or more processors are further configured to:

determine whether an update termination condition set for the population is satisfied, determine, in response to the update termination condition not being satisfied, whether a second portion of the population satisfies the convergence criteria, and generate, in response to the determination that the second portion satisfies the convergence criteria, a second new instance using the second portion and update the population by adding the second new instance to the population.

16. A processor-implemented method with neural network processing, the method comprising:

determining whether to refresh a population based on at least two of a time, a size of the population, a non-convergence of the population, and a local optimization of the population;

determining, in response to the determination to refresh the population, based on a convergence criterion comprising a dispersion of a predetermined threshold, a plurality of instances having converging features among the population comprising a plurality of instances to which different mixed-precision quantizations are applied for a neural network;

generating a new instance based on a representative value determined based on precisions of the determined plurality of instances corresponding to a same layer of the neural network;

updating the population by adding the new instance to the population, the updated population comprises instances that represent preferred trade-offs among a plurality of objectives for the neural network; and performing an inference based on the neural network using an instance selected from the updated population.

17. The method of claim 16, wherein the representative value is determined based on an average of the precisions of the determined instances corresponding to the same layer.

18. The method of claim 16, wherein the generating comprises determining a precision of the new instance corresponding to the same layer to be one of a plurality of predetermined precisions, by comparing the representative value to one or more predetermined thresholds.

19. The method of claim 16, wherein, for another layer of the neural network, the determined instances have a same precision, and wherein the representative value is determined based on a weight average of the precisions of the determined instances corresponding to the same layer.

20. The method of claim 19, wherein the generating comprises determining a precision of the new instance corresponding to other layer to be the same precision.

* * * * *